(12) United States Patent
Frank

(10) Patent No.: US 6,425,378 B1
(45) Date of Patent: Jul. 30, 2002

(54) DEVICE FOR DELIVERING FUEL FROM A STORAGE TANK TO THE INTERNAL COMBUSTION ENGINE OF A MOTOR VEHICLE

(75) Inventor: Kurt Frank, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,091

(22) PCT Filed: Jun. 19, 1999

(86) PCT No.: PCT/DE99/01804

§ 371 (c)(1),
(2), (4) Date: Mar. 21, 2000

(87) PCT Pub. No.: WO00/05089

PCT Pub. Date: Feb. 3, 2000

(30) Foreign Application Priority Data

Jul. 23, 1998 (DE) .......................... 198 33 130

(51) Int. Cl.⁷ .............................. F02M 37/04
(52) U.S. Cl. ...................... 123/514; 123/509
(58) Field of Search ............... 123/509, 514; 137/571, 576, 565.22; 417/198, 186

(56) References Cited

U.S. PATENT DOCUMENTS

| | | | | |
|---|---|---|---|---|
| 4,842,006 A | * | 6/1989 | Scheurenbrand et al. | ... 137/202 |
| 4,926,829 A | * | 5/1990 | Tuckey | ...... 123/497 |
| 5,289,810 A | * | 3/1994 | Bauer et al. | ...... 123/510 |
| 5,667,366 A | * | 9/1997 | Reef et al. | ...... 417/198 |
| 5,791,317 A | * | 8/1998 | Eck | ...... 123/510 |
| 5,878,724 A | * | 3/1999 | Channing | ...... 123/514 |
| 5,941,279 A | * | 8/1999 | Frank et al. | ...... 137/574 |

* cited by examiner

Primary Examiner—Willis R. Wolfe
Assistant Examiner—Mahmoud Gimie
(74) Attorney, Agent, or Firm—Michael J. Striker

(57) ABSTRACT

A device for pumping fuel out of a reservoir (10) to the internal combustion engine (12) of a motor vehicle has a jet pump (24), which pumps fuel, returning in a return line (22) from the engine (12), into a reserve container (14) of a fuel pumping unit (16) along with fuel located in the reservoir (10). According to the invention, an intake window (36) is provided, which is located above the propellant stream (38) of the jet pump (24), so that a storage chamber (46) for fuel returning from the reserve container (14) is embodied.

4 Claims, 2 Drawing Sheets

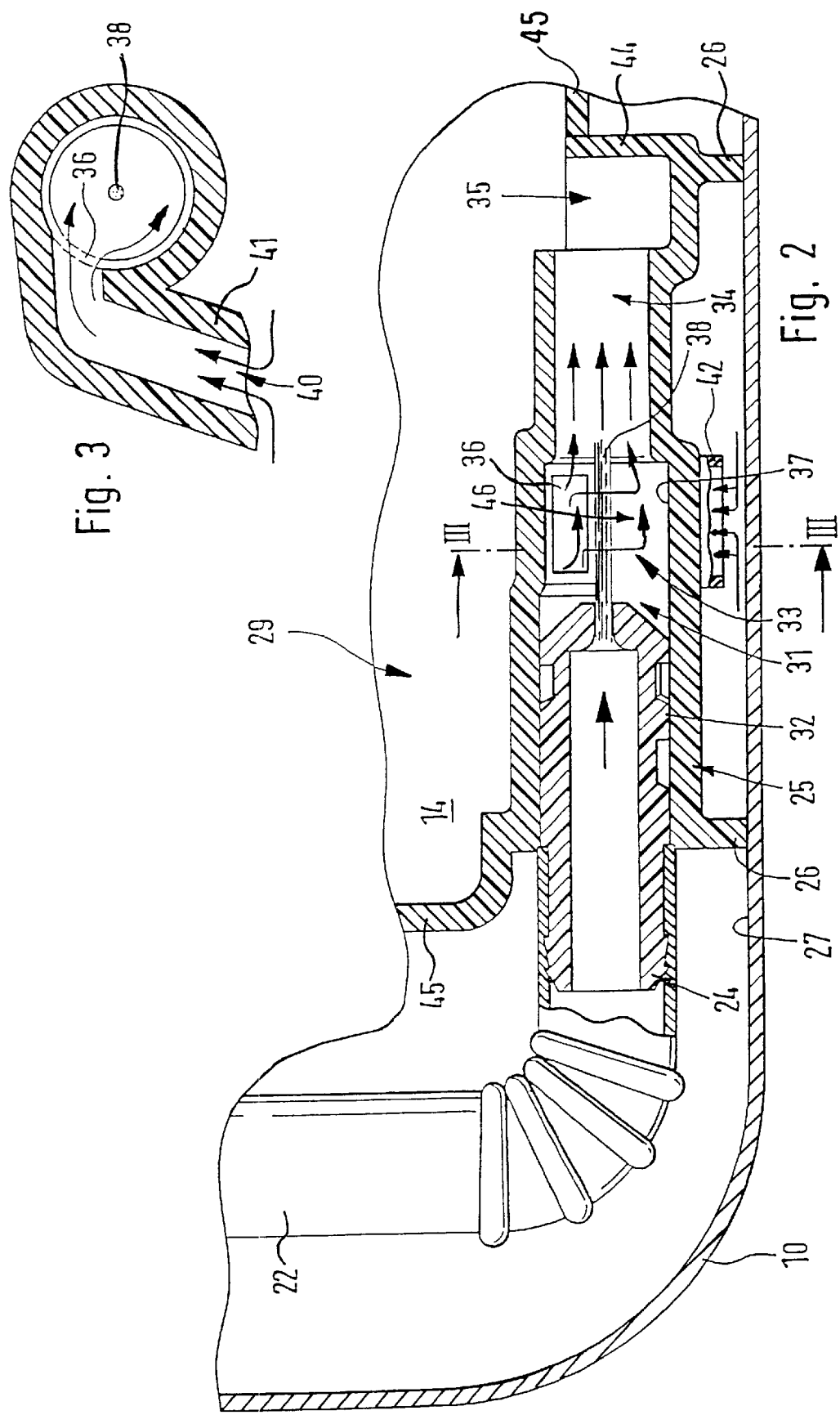

Figure 1:
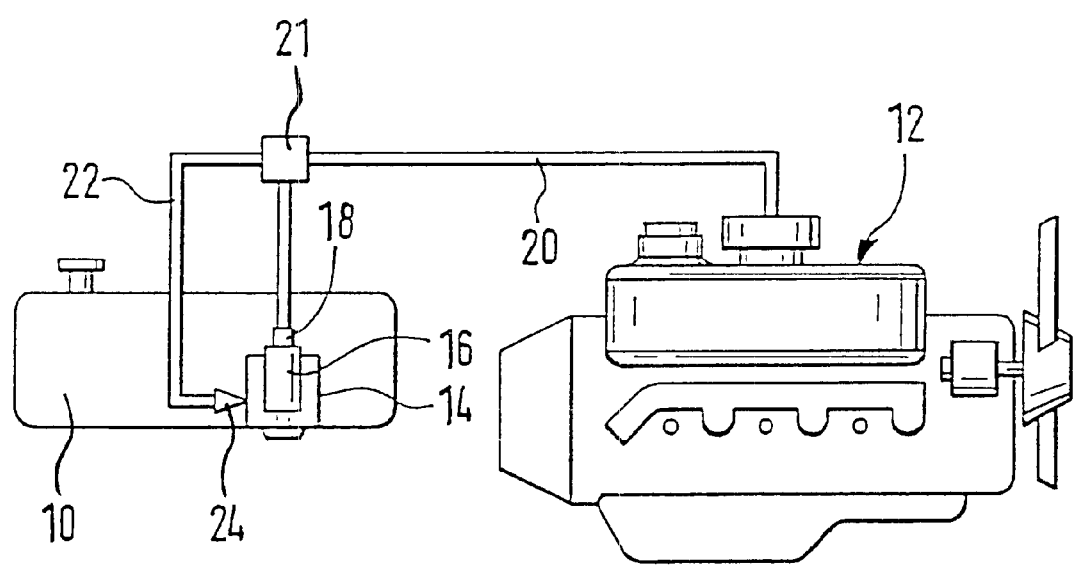

DEVICE FOR DELIVERING FUEL FROM A STORAGE TANK TO THE INTERNAL COMBUSTION ENGINE OF A MOTOR VEHICLE

PRIOR ART

The invention relates generally to a device for supplying fuel from a reservoir to the internal combustion engine of a motor vehicle. In particular, this invention relates to a device of this kind having a fuel reserve container disposed in the reservoir, a fuel pumping unit aspirating from the reserve container and communicating on the compression side with the engine, a fuel return line from the engine to the reservoir, a jet pump communicating with the return line and disposed in the reservoir, a chamber formed by the housing of the reserve container and defining a plurality of portions, the jet pump protruding into the chamber to pump fuel into the reserve container, and one portion of the chamber being provided with an opening communicating with the reservoir. In such known devices, the problem is that particularly when cornering when the reservoir or fuel tank is almost empty, the fuel collects in a peripheral region of the fuel tank. As a result, there is no longer any fuel in the region of the opening through which the jet pump aspirates the fuel from the fuel tank. Fuel from the reserve container can thus flow out through the opening via the mixing tube into the fuel tank, allowing the fuel level in the reserve container to drop so much that it is no longer assured that the fuel pump will be supplied with enough fuel from the reserve container.

SUMMARY OF THE INVENTION

The device according to the invention for supplying fuel from a reservoir to the internal combustion engine of a motor vehicle is characterized by the provision of an elongated chamber defining a succession of cylindrical portions extending along the bottom of the reserve container and above the bottom of the reservoir; the jet pump protruding into the first cylindrical portion; the opening in the second cylindrical portion having the form of an intake window located in the upper half of the second portion above the fuel jet streaming from the jet pump, thus creating in the lower half of the chamber a storage space for fuel; the intake window communicating with the interior of the reservoir through a conduit whose intake orifice is located a short distance above the bottom of the reservoir; and the last cylindrical portion communicating with the interior of the reserve container through an opening located at the level of the intake window. The invention has the advantage over the prior art of preventing a return flow of fuel from the reserve container into the fuel tank. This assures that there will always be enough fuel in the reserve container, so that the fuel pump is always supplied with fuel.

Further advantages and advantageous refinements of the device according to the invention for supplying fuel from a reservoir to the internal combustion engine of a motor vehicle will become apparent from the following description of preferred embodiments, when taken in view with the accompanying drawings.

DRAWING

One exemplary embodiment of the invention is shown in the drawing and will be described in detail below.

Shown are:

FIG. 1, a device according to the invention for supplying fuel from a reservoir to the internal combustion engine of a motor vehicle, in simplified form;

FIG. 2, a detail of the device of FIG. 1 in longitudinal section; and

FIG. 3, a section taken along the line III—III of FIG. 2.

DESCRIPTION OF THE EXEMPLARY EMBODIMENT

In FIG. 1, a device which is used to supply fuel from a reservoir 10 to the internal combustion engine 12 of a motor vehicle is shown in simplified form. A reserve container 14 is disposed in the reservoir 10, and a fuel pumping unit 16 disposed in the reserve container 14 aspirates fuel from it. A pressure line 20 that leads to the engine 12 is connected to a pressure fitting 18 of the fuel pumping unit 16. Also disposed in the pressure line 20 is a pressure regulator 21, which regulates the pressure of the fuel pumped in the pressure line 20 to the system pressure intended for the engine 12. From the pressure regulator 21, a return line 22 leads back to the reservoir 10; through this line, the fuel not needed by the engine 12 flows back into the reservoir 10.

Communicating with the return line 22 is a jet pump 24, disposed inside the reservoir 10, which pumps fuel into the reserve container 14. During operation of the engine 12, the fuel pumping unit 16 pumps fuel out of the reserve container 14 to the engine 12, and the fuel flowing back through the return line 22 drives the jet pump 24.

In FIG. 2, the installation of the jet pump 24 in the reserve container 14 is shown in more detail. The housing 25 of the reserve container 14, made by plastic injection molding, has two feet 26, on which the reserve. container 14 stands on the bottom 27 of the reservoir 10. Between the interior 29 of the reserve container 14 and the reservoir 10, a passageway 31 is formed, which has a plurality of portions 32–35.

One end of the cartridge-like jet pump 24 protrudes into the first, cylindrical portion 32, while the return line 22 is slipped over the other end of the jet pump. What is also essential is that the jet pump 24 be disposed in the first portion 32 in such a way that no fuel whatever can flow out of the first portion 32 into the reservoir 10. The also cylindrical second portion 33 concentrically adjoins the jet pump 24 and the first portion 32.

The disposition and embodiment of an intake window 36 located in the second portion 33 is essential to the invention. The intake window 36, which is rectangular in this exemplary embodiment, is disposed above the bottom 37 of the second portion 33 and above the propellant stream, marked 38, of the jet pump 24. The intake window 36 is a component of an intake conduit 40, through which fuel flows out of the reservoir 10 into the second portion 33. The intake. conduit 40 is embodied inside an intake manifold 41, whose intake fitting 42 has its orifice just above the bottom 27 of the reservoir 10.

In a preferred embodiment of the invention, the intake manifold 41 is made together with the rest of the reserve container 14 in a single production step by plastic injection molding. The second portion 33 is adjoined by the third, also cylindrical portion 34, which is reduced in diameter relative to the second portion 33 and is also called a mixing tube. The third portion 34 opens into a fourth portion 35, designated as a collecting chamber, whose impact wall 44 remote from the jet pump 24 at the same time forms the outer wall 45 of the reserve container 14.

From the above-described disposition and embodiment of the portions 32–35 and of the intake window 36, it can be seen that the portions 32–35 form a tub-like storage chamber 46 below the intake window 36. As a consequence of this storage chamber 46, for instance when the jet pump 24 is not in operation and the fuel level in the reservoir 10 is below the intake window 36, fuel flows out of the reserve container 14 back into the portions 32–35, so that in these portions 32–35 there is always a fuel reserve, the level of which is at the level of the intake window 36.

The device described above functions as follows: In normal operation of the motor vehicle, especially when driving straight ahead and/or if the reservoir 10 is relatively full, the fuel level in the reservoir 10 is always at least high enough that there is fuel in the region of the intake fitting 42 of the intake conduit 40. As a result, when the jet pump 24 is in operation, fuel is aspirated through the intake conduit 40 by the propellant stream 38 of the jet pump, and this fuel enters the second portion 33 via the intake window 36 and is entrained by the propellant stream 38. This entrained fuel mixes with the propellant stream 38 in the region of the third portion 34, and arrives under pressure in the reserve container 14 via the fourth portion 35.

If when cornering and with a relatively empty reservoir 10 there is no longer any fuel in the region of the intake fitting 42, then the propellant stream cannot aspirate any more fuel from the reservoir 10 through the intake conduit 40, either. As a result, fuel from the reserve container 14 fills the storage chamber 46 up to the level of the intake window 36, at most. The fuel now surrounding the propellant stream 38 in the storage chamber 46 and flowing back from the reserve container 14 is engaged by the propellant stream 38, however, and is fed back into the reserve container 14. This prevents fuel from reaching the intake conduit 40 through the intake window 36 and flowing back into the reservoir 10.

To effect an aspiration of fuel via the intake window 36 even if the third portion 34 is completely empty, the jet pump 24 must be designed as a self-aspirating pump. This can be accomplished by providing that the third portion 34 is so small in diameter and is relative long enough that the propellant stream 38 completely fills up the third portion 34. The aspiration is reinforced by the chamber-like fourth portion 35, in which the propellant stream 38 collects, so that given a suitable level in the fourth portion 35, the propellant stream 38 strikes the fuel that has collected there.

What is claimed is:

1. A device for supplying fuel from a reservoir to an internal combustion engine of a motor vehicle, having a reserve container disposed in the reservoir, a fuel pumping unit aspirating from the reserve container and communicating on its compression side with the engine, a fuel return line from the engine to the reservoir, a jet pump communicating with the return line and disposed in the reservoir, comprising an elongated chamber formed in the reserve container and defining a plurality of cylindrical portions extending along a bottom part of the reserve container; the bottom part of the reserve container being spaced apart from a bottom part of the reservoir; the jet pump protruding into the first cylindrical portion to propel a fuel jet through the chamber into the reserve container; the upper half of the second cylindrical portion above the fuel jet streaming from the jet pump being provided with an intake window; the intake window communicating with the reservoir through a conduit having an intake orifice located a short distance above the bottom part of the reservoir; and the last cylindrical portion communicating with the interior of the reserve container through an opening located substantially at the level of the intake window, thus creating a storage space for the fuel in the lower half of the elongated chamber.

2. The device as claimed in claim 1, wherein the conduit communicating with the intake window is part of the reserve container.

3. The device as defined in claim 2, wherein the reserve container is embodied as an injection-molded plastic part.

4. The device as claimed in claim 1, comprising a cylindrical portion located between the second and the last cylindrical portion, whose cross-sectional area is completely filled by fuel from the jet stream.

\* \* \* \* \*